Patented Aug. 12, 1952

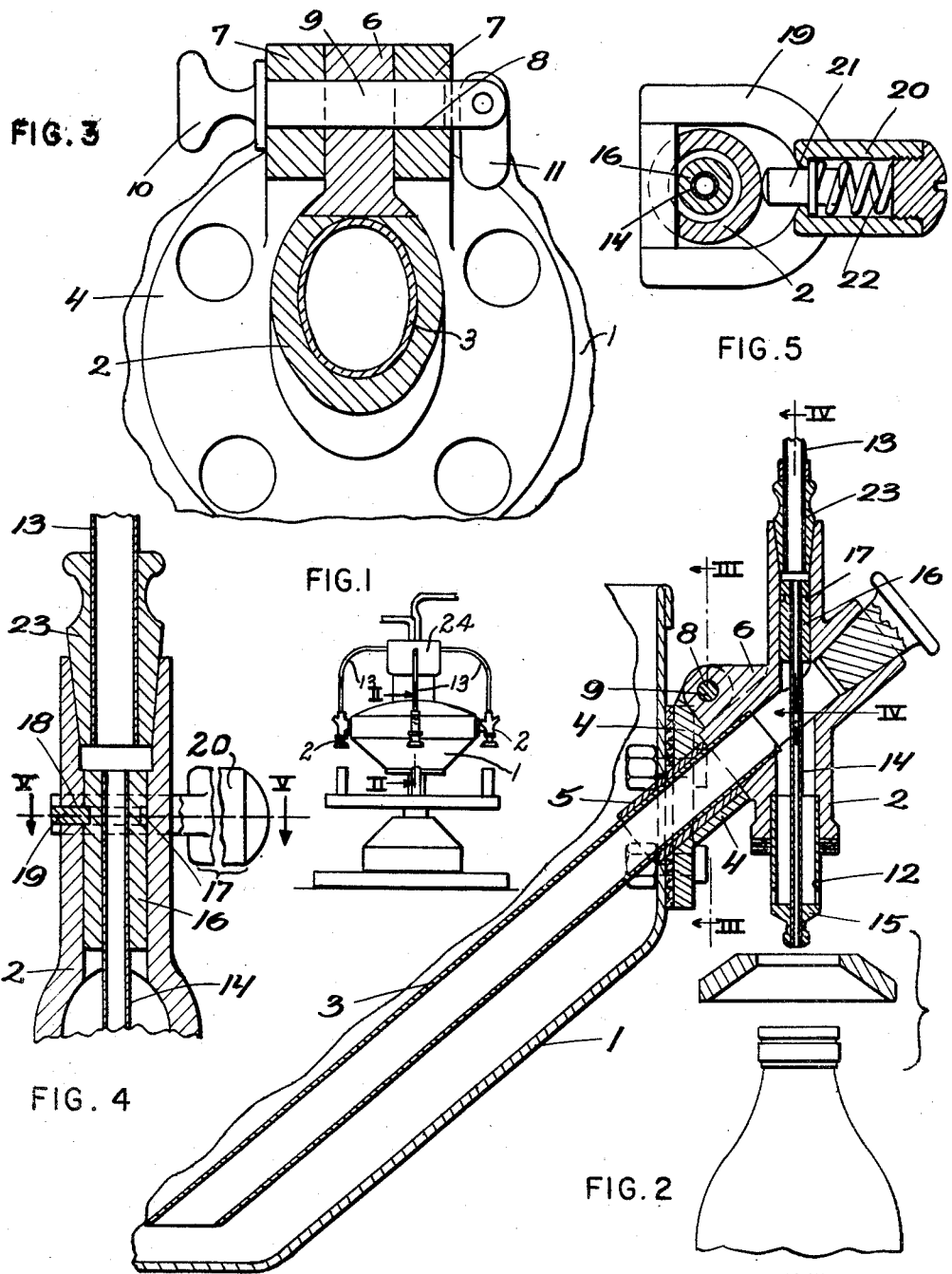

2,606,706

UNITED STATES PATENT OFFICE 2,606,706

BOTTLE FILLING APPARATUS

Christian Niels Nielsen, Malmo, Sweden, assignor to Aktiebolaget Bryggerimaskiner, Malmo, Sweden, a corporation of Sweden Application June 9, 1947, Serial No. 753,463
In Sweden April 14, 1945

Section 1, Public Law 690, August 8, 1946
Patent expires April 14, 1965

2 Claims. (Cl. 226—116)

For filling bottles with liquids, vacuum filling apparatus having filler nozzles mounted on a liquid container have found extensive use. Each filler nozzle is connected not only to the liquid container by a liquid pipe which in the nozzle communicates with a filler pipe dipping into the bottle, but also to a vacuum container by a vacuum pipe which in the nozzle communicates with a suction pipe dipping into the bottle.

As such filling apparatus have found extensive use when filling milk and cream and other easily spoiled and easily infected liquids, the apparatus must be constructed in such a way as to satisfy also very advanced hygienic demands. It has recently been found that it is not sufficient for those parts which come into direct contact with the milk to be arranged in such a way as to be easily cleaned, but the apparatus as a whole must also be constructed in such a way that all the parts of the apparatus are easily detachable for complete cleaning, so that the apparatus will not have any inaccessible nooks and corners in which dirt may gather and fall down on those parts which come into contact with the milk or the bottles. This applies in particular to the securing means for the detachable parts of the apparatus which are to be detached every day for cleaning, especially the securing means for the liquid and suction pipes. The chief object of the invention is therefore to provide securing means for those parts which are constructed in such a way as to be removable completely for cleaning purposes. As the apparatus is provided with a great many filler nozzles whose parts are to be removed and cleaned every day, a further object of the invention is to construct the securing means also for these parts, so that they are easily removable without requiring such time-consuming work as screwing the parts off and on.

Further objects and advantages of the invention will be clear to those skilled in the art by the following description of an embodiment of a bottle filler apparatus according to the invention, shown by way of example in the accompanying drawing.

In the drawing Fig. 1 is an elevation of a filling apparatus according to my invention, Figure 2 is a vertical section through a filling nozzle and associated parts as indicated by line II—II on Fig. 1, Figs. 3 and 4 are sections along the lines III—III and IV—IV, respectively, of Fig. 2, and Fig. 5 is a section along the line V—V of Fig. 4.

The apparatus has a liquid container 1 having a number of filler nozzles 2. In the embodiment shown, each filler nozzle has a liquid pipe 3 dipping into the liquid container 1 and retained in place in the liquid container by being inserted in a flanged support 4, secured to the liquid container, in which it fits snugly. For the purpose of facilitating the removal of the liquid pipe from the liquid container, the liquid pipe is provided in the embodiment shown with an enlargement in the form of a sleeve 5 along that short part of its length which is directly surrounded by the support 4, so that the liquid pipe snugly fits in the support 4 only by the intermediary of the sleeve 5, while the rest of the pipe may easily be pulled through the support. To be secured in position, the filler nozzle is provided with an extension 6 which may be inserted between ears 7 on the support 4, as shown in Figs. 2 and 3, so that pin holes 8 in the extension 6 and ears 7 are caused to register, after which a locking pin 9 may be inserted through these holes. In order to remove the nozzle for cleaning purposes, the only thing one has to do is to pull out the locking pin 9, after which the nozzle and the liquid pipe may be removed directly without any screwing. In order that the pin 9 shall remain in position, it is provided, according to the invention, with a knob 10 at one end and a transverse member 11 at the other end which pivotally connected to the pin and may be turned into alignment with the pin for enabling the insertion of the pin in the pin holder. In the filler nozzle each liquid pipe 3 communicates in a manner known per se with a filler pipe 12.

A vacuum pipe 13 connected to a vacuum container 24 leads to the filler nozzle 2. In the filler nozzle, this vacuum pipe 13 is in communication with a suction pipe 14 which is inserted through the liquid pipe 12 from below in such a way that a stop 15 on the suction pipe 14 will engage the lower end of the liquid pipe 12 at the same time as the upper end of the suction pipe, which has an enlargement 16 for separating the vacuum pipe 13 from the liquid pipe 3, is in place in the neighborhood of the vacuum pipe 13. The enlargement 16 has an annular recess 17 which registers with an opening 18 in the filler nozzle 2 when the suction pipe 14 is in place. Through the opening 18 part of a spring clamp may enter for retaining the suction pipe in the filler nozzle. As shown in the drawing, the spring clamp comprises a yoke 19 surrounding the filler nozzle and provided with a spring casing 20, serving as a guide for a pin 21, and a spring 22 tending to press the free end of the pin into engagement with the filler nozzle 2, so that the yoke is drawn into the opening 18 and enters the recess 17 and thereby retaining the suction pipe in its operative position.

Release of the suction pipe and complete removal of the spring clamp is, therefore, easily effected by pressing the spring casing 20.

The vacuum pipe 13 carries on its free end a stopper 23 retained in the filler nozzle simply by being forced into the same.

In order to remove the whole filler nozzle, it is merely necessary, as mentioned above, to pull out the pin 9, after which the liquid pipe 3 may be pulled out directly from the support 4. In order to remove the suction pipe 14 one simply has to loosen the spring clamp 19, 20 and pull out the suction pipe thus released. The locking pin 9 as well as the spring clamp 19, 20 may be easily removed from the machine for cleaning purposes, so that no particles of dirt may gather around these parts and fall down into the bottles or come into contact with the milk.

What I claim and desire to secure by Letters Patent is:

1. In combination with a liquid container for a bottle filling apparatus, supporting means connected to said container and provided with a passage therethrough, said supporting means also being provided with two spaced ears respectively having a bore therethrough arranged so that the longitudinal axes of said bores are in alignment with each other, a liquid conveying tube extending into said container and having a portion adjacent said supporting means frictionally fitting in said passage, a nozzle adapted to receive a filler pipe for filling a bottle, a suction pipe and a vacuum pipe for creating a suction effect within said nozzle, said nozzle having tongue means extending into the space between said ears and having a bore through said tongue means in axial alignment with the bores through said ears, and pin means removably located in and extending through said bores in said ears and said bore in said tongue means for detachably connecting said nozzle to and locking the same in proper position relative to said supporting means.

2. In combination in a bottle filling apparatus, a liquid container, a plurality of filler nozzles mounted in said container, a filler pipe supported by each of said filler nozzles for conveying liquid therethrough to the bottles to be filled, liquid conveying pipes respectively extending into each of said nozzles and communicating with the filler pipes for conveying to the latter liquid from said container, a plurality of supporting means connected to said container and respectively associated with each of said nozzles and having a bore therethrough, a plurality of sleeves respectively connected to said liquid conveying pipes and adapted frictionally to be received and held in said bores of said supporting means, tongue means connected to said nozzles and arranged between ears connected to the adjacent supporting means, said tongue means having a bore therethrough arranged in axial alignment with corresponding bores in the adjacent ears, pin means detachably mounted in the bores of said ears and the bore of said tongue means for detachably and hingedly interconnecting each nozzle with the adjacent supporting means, and means connected to said pin means for selectively locking said pin means in its connecting position.

CHRISTIAN NIELS NIELSEN.

REFERENCES CITED

The following references are of record in the file of this patent:

UNITED STATES PATENTS

| Number | Name | Date |
| --- | --- | --- |
| 119,302 | Bridgman | Sept. 26, 1871 |
| 1,232,105 | Shelor | July 3, 1917 |
| 1,665,948 | Broadhurst | Apr. 10, 1928 |
| 1,736,771 | Dicely | Nov. 26, 1929 |
| 1,929,736 | Fagen | Oct. 10, 1933 |
| 1,978,002 | Weaver | Oct. 23, 1934 |
| 2,147,366 | Fagen et al. | Feb. 14, 1939 |
| 2,196,096 | Broadhurst | Apr. 2, 1940 |

FOREIGN PATENTS

| Number | Country | Date |
| --- | --- | --- |
| 201,344 | Great Britain | Aug. 2, 1923 |
| 525,940 | Great Britain | Sept. 6, 1940 |